(12) United States Patent
Simhadri et al.

(10) Patent No.: US 11,599,578 B2
(45) Date of Patent: Mar. 7, 2023

(54) BUILDING A GRAPH INDEX AND SEARCHING A CORRESPONDING DATASET

(71) Applicant: Microsoft Technology Licensing, LLC, Redmond, WA (US)

(72) Inventors: Harsha Vardhan Simhadri, Telangana (IN); Ravishankar Krishnaswamy, Tamil Nadu (IN); Suhas Jayaram Subramanya, Pittsburgh, PA (US); Devvrit, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 16/582,682

(22) Filed: Sep. 25, 2019

(65) Prior Publication Data

US 2020/0410003 A1    Dec. 31, 2020

Related U.S. Application Data

(60) Provisional application No. 62/868,664, filed on Jun. 28, 2019.

(51) Int. Cl.
*G06F 16/901* (2019.01)
*G06F 16/9035* (2019.01)
(Continued)

(52) U.S. Cl.
CPC ...... *G06F 16/9024* (2019.01); *G06F 16/9035* (2019.01); *G06F 16/90335* (2019.01); *G06K 9/6276* (2013.01)

(58) Field of Classification Search
None
See application file for complete search history.

(56) References Cited

U.S. PATENT DOCUMENTS 10,776,334 B2* 9/2020 Cao .................. G06F 16/906
2013/0230255 A1* 9/2013 Wang .................. G06F 16/583
382/201

(Continued)

OTHER PUBLICATIONS

Jegou, et al., "Searching in One Billion Vectors: Re-rank with Source Coding", In Proceedings of the IEEE International Conference on Acoustics, Speech and Signal Processing, May 22, 2011, 4 Pages.

(Continued)

*Primary Examiner* — Kris E Mackes
*Assistant Examiner* — Soheila (Gina) Davanlou
(74) *Attorney, Agent, or Firm* — Ray Quinney & Nebeker P.C; James Bullough (57) ABSTRACT

The present disclosure relates to generating a search graph or search index to aid in receiving a search query and identifying results of a dataset based on the search query. For example, systems disclosed herein may generate a navigable search graph including vertices representative of objects or points within a dataset that enables a computing device having access to the search graph to navigate vertices of the graph along an identified path until arriving at a point within the search graph that corresponds to a value associated with the search query. Upon identifying a location within the graph corresponding to the search query, systems disclosed herein may identify a neighborhood of points (e.g., vertices) corresponding to items from the dataset and output a set of results for the search query representative of determined results for the search query.

20 Claims, 8 Drawing Sheets

(51) Int. Cl.
G06F 16/903 (2019.01)
G06K 9/62 (2022.01)

(56) References Cited

U.S. PATENT DOCUMENTS

| | | | | |
|---|---|---|---|---|
| 2018/0268040 A1* | 9/2018 | Shuma | ................ | G06F 16/2343 |
| 2019/0050672 A1* | 2/2019 | Shang | ................ | G06K 9/6215 |
| 2019/0108575 A1* | 4/2019 | Gupta | ................ | G06Q 30/0633 |
| 2020/0104426 A1* | 4/2020 | Wu | ........................ | G06N 20/00 |
| 2020/0133663 A1* | 4/2020 | Dwars | ........................ | G06F 8/75 |

OTHER PUBLICATIONS

Amsaleg, et al., "Datasets for Approximate Nearest Neighbor Search", Retrieved From http://corpus-texmex.irisa.fr/, Jul. 2010, 3 Pages.
Andoni, et al., "Near-Optimal Hashing Algorithms for Approximate Nearest Neighbor in High Dimensions", In Proceeding of Journal of Communications of the ACM, vol. 51 Issue 1, Jan. 2008, pp. 117-122.
Andoni, et al., "Optimal Data-Dependent Hashing for Approximate Near Neighbors", In Proceeding of the Forty-Seventh Annual ACM Symposium on Theory of Computing, Jun. 14, 2015, pp. 793-801.
Andoni, et al., "Practical and Optimal LSH for Angular Distance", In Proceedings of the 28th International Conference on Neural Information Processing Systems, vol. 1, Dec. 7, 2015, pp. 1-9.
Babenko, et al., "Efficient Indexing of Billion-Scale Datasets of Deep Descriptors", In Proceeding of IEEE Conference on Computer Vision and Pattern Recognition, Jun. 27, 2016, pp. 2055-2063.
Baranchuk, et al., "Revisiting the Inverted Indices for Billion-Scale 368 Approximate Nearest Neighbors", In Proceedings of the European Conference on Computer Vision, Sep. 2018, pp. 1-15.
Baranchuk, et al., "Revisiting the Inverted Indices for Billion-Scale Approximate Nearest Neighbors", In Journal of the Computing Research Repository, Feb. 2018, pp. 1-15.
Clarkson, Kenneth L., "An Algorithm for Approximate Closest-point Queries", In Proceedings of the Tenth Annual Symposium on Computational Geometry, Jun. 6, 1994, pp. 160-164.
Dong, et al., "Efficient K-Nearest Neighbor Graph Construction for Generic Similarity Measures", In Proceedings of the 20th International Conference on World Wide Web, Mar. 28, 2011, pp. 577-586.

Douze, et al., "Faiss: A Library for Efficient Similarity Search", Retrieved From https://research.fb.com/faiss-a-library-for-efficient-similarity-search/, Mar. 30, 2017, 3 Pages.
Ahle, et al., "On the Complexity of Inner Product Similarity Join", Proceedings of the 35th ACM SIGMOD-SIGACT-SIGAI Symposium on Principles of Database Systems, Jun. 26, 2016, pp. 151-164.
Fu, et al., "Fast Approximate Nearest Neighbor Search With The Navigating Spreading-out Graph", In Journal of International Conference on Very Large Data Bases Endowment, vol. 12, Issue 5, Jan. 2019, pp. 461-474.
Ge, et al., "Optimized Product Quantization", In Journal of IEEE Transaction Pattern on Pattern Analysis and Machine Intelligence, vol. 36, Issue 4, Apr. 2014, pp. 744-755.
Jaromczyk, et al., "Relative Neighborhood Graphs and Their Relatives", In Proceeding of IEEE, vol. 80, Issue 9, Sep. 1992, pp. 1502-1517.
Jegou, et al., "Product Quantization for Nearest Neighbor Search", In Journal of IEEE Transactions on Pattern Analysis and Machine Intelligence vol. 33, Issue 1, Jan. 2011, pp. 117-128.
Johnson, et al., "Billion-Scale Similarity Search with GPUs", In Journal of Computing Research Repository, Feb. 2017, pp. 1-12.
Kalantidis, et al., "Locally Optimized Product Quantization for Approximate Nearest Neighbor Search", In IEEE Conference on Computer Vision and Pattern Recognition, Jun. 23, 2014, pp. 2329-2336.
Malkov, et al., "Efficient and Robust Approximate Nearest Neighbor Search Using Hierarchical Navigable Small World Graphs,", In Journal of Computing Research Repository, Mar. 2016, pp. 1-13.
Zhang, et al., "Zoom: Ssd-based vector search for optimizing accuracy, latency and memory", In Journal of Computing Research Repository, Sep. 2018, pp. 1-14.
Hajebi, et al., "Fast Approximate Nearest-Neighbor Search with κ-Nearest Neighbor Graph", In Proceedings of the Twenty-Second International Joint Conference on Artificial Intelligence, Jul. 19, 2011, pp. 1312-1317.
Li, et al., "Approximate Nearest Neighbor Search on High Dimensional Data—Experiments, Analyses, and Improvement (v1.0)", In the Repository of arXiv: 1610.02455v1, Oct. 8, 2016, 26 Pages.
"International Search Report and Written Opinion Issued in PCT Application No. PCT/US2020/031739", dated Aug. 20, 2020, 12 Pages.

* cited by examiner

BUILDING A GRAPH INDEX AND SEARCHING A CORRESPONDING DATASET

CROSS-REFERENCE TO RELATED APPLICATIONS

This application claims the benefit of and priority to U.S. Provisional Patent Application Ser. No. 62/686,664, entitled "BUILDING A GRAPH INDEX AND SEARCHING A CORRESPONDING DATASET," filed on Jun. 18, 2019, the entirety of which is incorporated herein by reference.

BACKGROUND

Recent years have seen a significant rise in the use of computing devices (e.g., mobile devices, personal computers, server devices) to create, store, and share data. Indeed, tools and applications for creating and searching datasets are becoming more and more common. These datasets include an increasing number and variety of digital objects of various datatypes therein. As databases become larger and more complex, conventional tools and techniques for searching databases have become inefficient, inaccurate, and increasingly expensive. Indeed, conventional techniques for searching or otherwise navigating large datasets often experience high latency and/or low throughput while producing inaccurate results. In addition, many conventional techniques expend massive computing resources in order to identify accurate results from datasets without a frustrating delay.

DETAILED DESCRIPTION

Many conventional search systems involve a dataset of base points in a metric space. Search applications may design or receive a data structure of a size such that, for any query in the same metric space and a target number (k), the search application can retrieve k-nearest neighbors (or approximately k-nearest neighbors) of the query from the dataset in an efficient manner and while limiting expense of processing resources. Search applications and algorithms implemented thereon can be used in diverse areas such as computer vision, document retrieval, and recommendation systems. In these applications, entities such as images, documents, user profiles, etc. may be embedded in Euclidean metrics in hundreds of dimensions such that a desired notion of similarity is encoded as distance between embedded points (e.g., u and v). To avoid an expensive or impossible linear scan of data, many search applications identify nearest neighbors to respective points of the dataset using a variety of algorithms and methodologies.

Conventional search systems for receiving and processing search queries, however, are often incapable of achieving a desired latency, throughput, and/or accuracy required to output satisfactory search results (e.g., where a large number of points are to be indexed on a single node). For instance, some conventional search systems compress dataset representations to achieve faster throughput and latency, but fail to achieve adequate recall (e.g., accuracy) rates. In addition, some conventional search systems achieve more accurate and fast results by storing indices on the main memory of computing devices; however, these methods often involve astronomical processing costs as datasets increase in size and complexity.

The present disclosure relates to a search graph generation system (or simply "graph generation system") for generating a search graph or search index to aid in processing a search query and identifying results of a dataset based on the search query. In particular, as will be discussed in further detail below, a graph generation system may generate a navigable search graph including vertices representative of objects within a dataset that enables a computing device having access to the search graph to navigate (e.g., walk through) vertices of the graph along a path of vertices until arriving at a point within the search graph that corresponds to a value associated with the search query. Indeed, upon identifying a location within the graph corresponding to the search query, a query search system may identify a neighborhood of points (e.g., vertices) corresponding to items from the dataset and output a set of results for the search query representative of determined results for the search query.

As will be discussed below, the graph generation system can generate the search graph in a variety of ways to accomplish one or more benefits described herein. For example, in one or more embodiments, the graph generation system generates a random graph including a set of vertices and randomly generated edges (e.g., out-neighbor connections between vertices) connecting each vertex from the set of vertices to other vertices within the random graph. The graph generation system may generate a first iteration of the search graph using a search algorithm (e.g., a greedy search algorithm) in which the graph generation system ensures that it is possible to reach any vector from a navigation point using a search algorithm (e.g., a greedy search algorithm). In addition to ensuring navigability of the search graph, the graph generation system may further update out-neighbor data based on the identified paths. In addition, the graph generation system may perform a second iteration of the search algorithm in which out-neighbor data is added or otherwise updated within the search graph to generate refined or otherwise optimized search graph in which a number of hops between vertices of the set of vertices is reduced or otherwise optimized.

The present disclosure provides a number of practical applications that provide benefits and/or solve problems associated with generating and utilizing search graphs to process search queries in connection with a dataset. For example, by generating a random graph and iteratively updating the out-neighbor data in connection with one or more embodiments described herein, the graph generation system can generate an optimized search graph that facilitates accurate recall of results for a search query. Indeed, by generating and utilizing search graphs based on features and functionalities described herein, the graph generation system can generate and implement search graphs that both minimize a number of hops between vertices (e.g., resulting in fewer reads of stored data) while increasing accuracy over conventional systems for generating and implementing search graphs. In this way, the graph generation system can facilitate faster and more accurate searches of datasets.

By reducing the number of hops and subsequent reads of the search graph and associated data, the graph generation system can additionally reduce the processing expense over conventional search systems. For example, the graph generation system can store the search graph on a storage space (e.g., solid state drive (SSD) storage) of a computing device rather than on limited memory of the computing device while enabling identification of search results with acceptable latency and throughput metrics. Indeed, one or more embodiments described herein can generate a search index that enables a computing device having a limited memory (e.g., 64 GB RAM) and using SSD storage to serve 5000+ queries per second with less than 3 millisecond latency while achieving 95% recall on a billion-point dataset. This is in contrast with state-of-the-art algorithms (e.g., inverted and data compression algorithms) with similarly memory footprints that plateau at 50% recall using exclusively compressed datasets. This is further in contrast to other state-of-the-art algorithms (hierarchical navigable small world algorithms) that often require hundreds of GBs of memory to accomplish similar throughput and latency results on significantly smaller sized datasets.

The graph generation system can further include features and functionality that enable generation and implementation of the search graphs on the same computing device. For instance, in one or more examples described herein, a computing device may generate a search graph for a respective subset of a dataset using methods and techniques described in connection with various embodiments. The graph generation system can additionally combine search graphs for corresponding subsets to construct a combined search graph that accomplishes similar results and benefits as systems described that involve generating the search graph for the entire dataset. In this way, the graph generation system can both generate and implement a search graph using fewer processing resources than conventional systems.

As illustrated in the foregoing discussion, the present disclosure utilizes a variety of terms to describe features and advantages of embodiments of the graph generation system described herein. Additional detail will now be provided regarding the meaning of some of these terms. For example, as used herein, a "dataset" refers to a representation of a set of objects. In one or more implementations described herein, a dataset refers to a collection of numbers representative of objects (e.g., documents, images, videos, files, digital content). In one or more embodiments, the dataset is represented by a set of vectors including any number of dimensions that may be used to identify corresponding objects within a collection of objects. While one or more embodiments described herein illustrate search graphs based on two-dimensional representations of the dataset, it will be appreciated that the dataset may be represented using numbers or vectors having any number of dimensions (e.g., 10s, 100s of dimensions).

In one or more embodiments described herein, a dataset may refer to a compressed dataset or a non-compressed dataset. As used herein, a "non-compressed" dataset refers to a full representation of a collection of objects including vectors or other collection of numbers in which corresponding objects may be precisely identified and associated with corresponding entries from the non-compressed dataset. Alternatively, a "compressed dataset" may refer to a reduced dataset in which values or coordinates of the non-compressed dataset have been compressed, encoded, or otherwise reduced for storage, processing, or other purposes. Indeed, a compressed dataset may refer to an approximation of the non-compressed dataset.

As used herein, a "search graph" or "search index" refer interchangeably to a data structure including a set of vertices representative of points with a corresponding dataset. Each of the vertices may refer to a corresponding entry from the database. A search graph may further include out-neighbor or edge data indicating vertices within the search graph linked to other vertices. Moreover, the search graph may include neighbor data including an identification of vertices within the search graph that are near to or otherwise within the neighborhood of other vertices. As used herein, an "out-neighbor" or "edge" within a search graph refers to a connection between vertices of the search index.

Moreover, neighboring information for a vertex or corresponding datapoint may include an indication of any number of out-neighbors connecting a vertex to one or more additional vertices of a search graph. In one or more implementations, neighboring information may further include information indicating one or more points within the dataset within a vicinity (e.g., within a threshold distance within a spatial representation of the dataset) of the vertex. For instance, neighboring information may include an indication of a predetermined number of datapoints that are closest to a given datapoint within the dataset.

As used herein, a "search algorithm," "navigation algorithm," or "navigable search algorithm" refers to an algorithm or process for executing a search using a search index. For example, a search algorithm may include an algorithm including rules or otherwise trained to identify a path through the search index that connects a navigation vertex (e.g., an initial vertex) with an identification of a destination vertex or neighborhood of nodes that correspond with a query or other target. In one or more embodiments described herein, a search algorithm or navigation algorithm refers to a greedy search algorithm in which a path is defined on a vertex-by-vertex basis in which a next most promising vertex is identified until converging or otherwise arriving at a vertex or neighborhood corresponding to a query.

Figure 1:
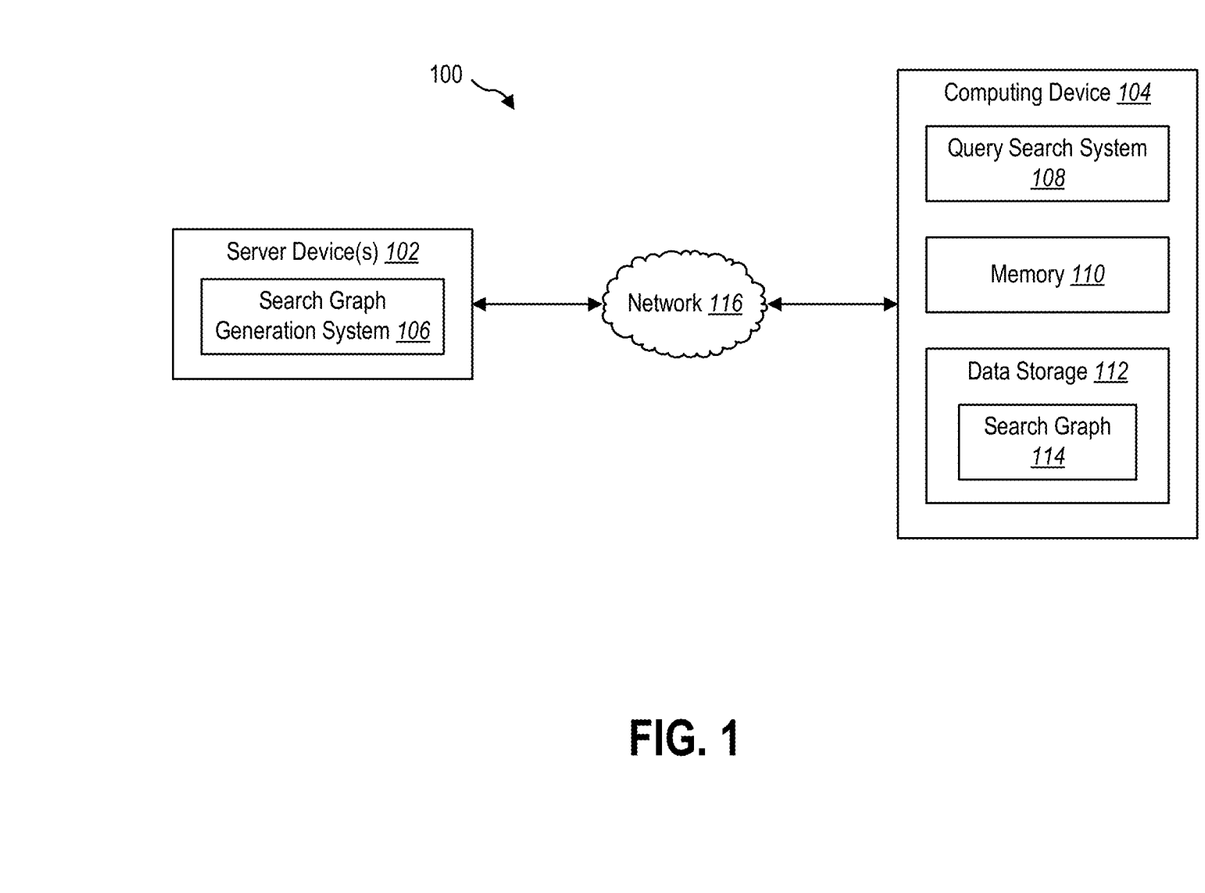
FIG. 1 illustrates an example environment including an index generation system and query search system in accordance with one or more embodiments.

Additional detail will now be provided regarding a graph generation system and query search system in accordance with one or more example implementations. For example, FIG. 1 illustrates an example environment 100 that includes a diagram of one or more server device(s) 102 and a computing device 104. As shown in FIG. 1, the server device(s) 102 includes a search graph generation system 106 (or simply "graph generation system 106"). As further shown, the computing device 104 includes a query search system 108. The computing device 104 may further include a memory 110 (e.g., random access memory (RAM) and data storage 112 (e.g., SSD storage) having a search graph stored 114 stored thereon or otherwise accessible to the query search system 108.

As further shown in FIG. 1, the server device(s) 102 and computing device 104 may communicate with each other directly or indirectly through a network 116. The network 116 may include one or multiple networks and may use one or more communication platforms or technologies suitable for transmitting data. The network 116 may refer to any data link that enables the transport of electronic data between devices and/or modules of the environment 100. The network 116 may refer to a hardwired network, a wireless network, or a combination of hardwired and wireless networks. In one or more embodiments, the network 116 includes the Internet.

The computing device 104 may refer to various types of computing devices. For example, the computing device 104 may include a mobile device such as a mobile telephone, a smartphone, a PDA, a tablet, or a laptop. Additionally, or alternatively, the computing device may include a non-mobile device such as a desktop computer, server device, or other non-portable device. In one or more embodiments, the computing device refers to a computing device having approximately 64 GB of memory and an SSD storage capable of storing and providing access to the search graph 114. In addition, the server device(s) 102 may similarly refer to various types of computing devices. Each of the computing device 104 and server device(s) 102 may include features and functionality described below in connection with an example computing device illustrated in FIG. 8.

As will be discussed in further detail below, the graph generation system 106 may generate the search graph 114 to aid in processing search queries of a searchable dataset representative of a large collection of digital objects. In particular, the graph generation system 106 may generate a random graph including a set of vertices and randomly generated edges connecting the vertices. The graph generation system 106 can additionally perform multiple iterations of a search algorithm (e.g., a greedy search algorithm) to generate a search graph (e.g., a refined search graph) in which every vertex of the search graph is navigable to other vertices within the graph while minimizing the number of hops between vertices when applying a navigation algorithm to a search query in connection with the generated search graph.

Upon generating the search graph, the graph generation system 106 can cause the server device(s) 102 to provide the search graph 114 to the computing device 104 for storage on the data storage 112 (e.g., an SSD storage) of the computing device 104. As shown in FIG. 1, the computing device 104 includes a query search system 108 for executing or otherwise processing a search query in accordance with one or more embodiments described herein. For instance, the query search system 108 may apply a navigation algorithm (e.g., the same algorithm as used in refining the search index) to the search query in connection with the stored search graph 114. As will be discussed further, applying the navigation algorithm to the search query may involve identifying a path through the search graph 114 from a navigation point to a vertex or neighborhood within the search graph 114 corresponding to the search query. The search query system 108 may further identify points or entries of the dataset corresponding to the vertex or neighborhood and output corresponding results of the search query.

While FIG. 1 illustrates an example environment 100 including a particular number and arrangement of the server device(s) 102 and computing device 104, it will be understood that the environment 100 may include alternative numbers or arrangements of devices. For example, while the environment 100 includes the graph generation system 106 implemented on the server device(s) 102 and the query search system 108 implemented on the computing device 104, in one or more embodiments described herein, the graph generation system 106 is implemented on the same computing device 104 as the query search system 108. Further, the graph generation system 106 and/or search query system 108 may be implemented wholly on one or both of the respective devices 102-104 (as shown) or may include one or more subcomponents implemented across multiple devices. Indeed, features and functionalities discussed herein in connection with the various systems may be implemented on one or across multiple devices. Moreover, in one or more embodiments, the graph generation system 106 and the query search system 108 may be processed on different server devices of the same or different cloud computing networks.

Figure 2:
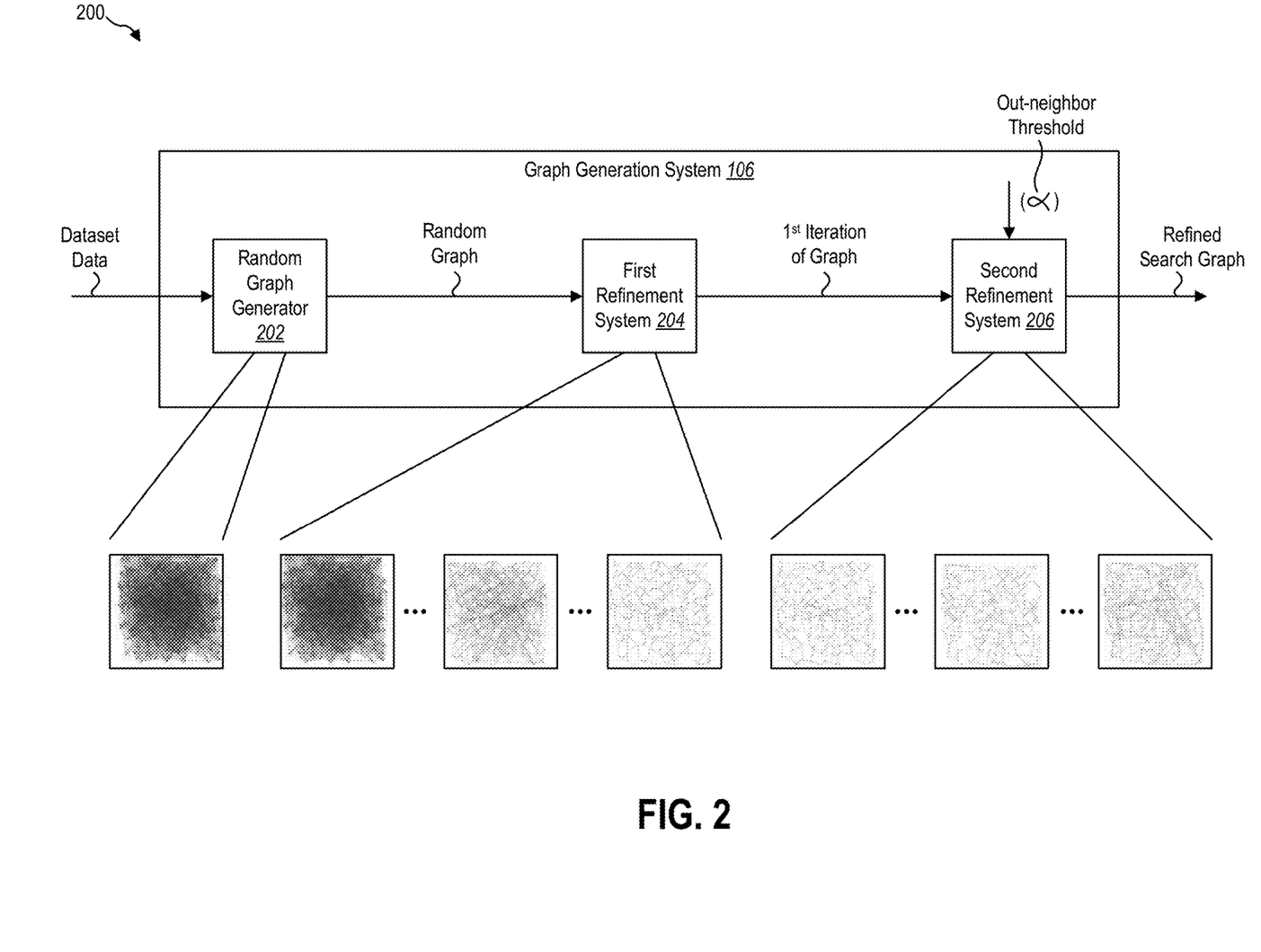
FIG. 2 illustrates an example workflow for generating a search graph in accordance with one or more embodiments.

Additional detail in connection with an example implementation of the graph generation system 106 is discussed in connection with FIG. 2. For example, FIG. 2 illustrates an example workflow 200 in which the graph generation system 106 generates a search index for use in performing a search for results of a search query within a dataset. As shown in FIG. 2, the graph generation system 106 may include a random graph generator 202, a first refinement system 204 and a second refinement system 206. Each of the components 202-206 within the graph generation system 106 may modify a set of vertices and associated neighborhood data (e.g., an identification of neighboring nodes, out-neighbor data) to generate a refined search graph (e.g., search graph 114) for use in searching the dataset.

As shown in FIG. 2, a random graph generator 202 may receive dataset data and generate a random graph based on the received data. In particular, the random graph generator may generate or identify a set of vertices associated with respective points of the dataset and identify random edges or out-neighbor connections between the set of vertices. The random graph generator 202 can randomly assign or otherwise associate a predetermined number of vertices within the set of vertices. As a non-limiting example for a billion-point dataset (or a dataset having approximately a billion points), the random graph generator 202 may assign 32 random edges for each vertex to generate a random graph in which each vertex is assigned 32 random out-neighbors within the random graph. The random graph generator 202 may randomly assign any number of out-neighbors depending on a size of the dataset or other constraint of the system on which the search index will be implemented.

The random graph may be provided to the first refinement system 204 for further processing. In one or more embodiments, the first refinement system 204 refines the random graph by applying a search algorithm to the random graph. In particular, the first refinement system 204 may apply a search algorithm (e.g., a greedy search algorithm) that identifies a path or set of vertices visited by a traversal between a pair of vertices along the randomly assigned edges. For example, the first refinement system 204 may identify a given vertex (e.g., a certain user-defined or otherwise estimated vertex) as a starting point and identify a path or set of vertices (e.g., using the randomly assigned edges between the vertices) that traces back to the given vertex (e.g., from the starting point to any given vertex). The first refinement system 204 may implement a greedy search algorithm trained to identify a promising candidate vertex (or multiple candidate vertices) closest to the destination vertex (e.g., the given vertex).

At each vertex along the path, the first refinement system 204 can expand or otherwise update out-neighbor information to include a path to a given vertex. In one or more implementations, the first refinement system 204 updates out-neighbor data for each vertex along the path such that each vertex includes an out-neighbor to a diverse set of vertices. In this way, the first refinement system 204 ensures that each vertex includes one or multiple paths from the start vertex in the search graph.

As shown in FIG. 2, the first refinement system 204 applies the search algorithm to each vertex of the random graph. On each pass, the first refinement system 204 updates out-neighbor data of vertices along the identified paths. In this way, the first refinement system 204 gradually improves the navigability of the search graph to construct a first iteration of the search graph for which every vertex includes a navigable path.

In one or more embodiments, the initial graph is a random graph (e.g., having randomly assigned edges) and refined using a self-improving algorithm. For example, the first refinement system 204 updates the graph at each vertex of each identified path as the search algorithm is applied and adds edges to make each initially identified vertex reachable. As the vertices are processed and the out-neighbor data improved, construction of the graph becomes more efficient and speeds up as availability of vertices improves, particularly in early stages of applying the search algorithm to the earlier identified vertices. As will be discussed in further detail below, because the earlier processed vertices may have a disadvantage of searching on a less navigable iteration of the search graph, the graph generation system 106 may perform a second pass of the search algorithm on an updated iteration of the graph (e.g., using the first and/or second refinement system 204-206).

As mentioned above, updating the out-neighbor data may involve adding out-neighbor connections or edges between vertices of the graph at each vertex when identifying a path between vertices. In addition to adding out-neighbor data, the graph generation system 106 (e.g., the first and/or second refinement system) may further delete edges as part of the process of updating the out-neighbor information. In one or more implementations, the graph generation system 106 enforces one or more limits or constraints on the number of edges or out-neighbors of a vertex to no more than a fixed number (e.g., 64, 128, 256).

As shown in FIG. 2, the first refinement system 204 provides an updated iteration (e.g., a first iteration) of the search graph to a second refinement system 206. The second refinement system 206 may perform a similar process as the first refinement system 204 by applying the search algorithm (e.g., a greedy search algorithm) to each vertex of the set of vertices and updating out-neighbor data for the vertices of each path identified when applying the search algorithm. The second refinement system 206 may randomly identify each vertex (e.g., in any order) or follow a different order depending on the randomly selected order of the vertices when performing the first pass of the search algorithm by the first refinement system 204.

In addition to generally running the search algorithm and updating out-neighbor data for the set of vertices, the second refinement system 206 can additionally optimize modification of the out-neighbor data to reduce a number of hops between vertices of the search graph. For example, as shown in FIG. 2, the second refinement system 206 can receive an out-neighbor threshold value ($\alpha$) that establishes a measure of aggressiveness in assigning new out-neighbor data to the vertices when applying the search algorithm to identify new paths through the search graph.

For example, in updating the out-neighbor data, the second refinement system 206 may update out-neighbor data to ensure each vertex has a direct out-neighbor connection to a given vertex (e.g., an initially identified vertex when applying the search algorithm). Alternatively, the second refinement system 206 may ensure that an out-neighbor of a given vertex along the identified path has another out-neighbor closer to the starting vertex than the given vertex when scaled by the out-neighbor threshold value. More specifically, the second refinement system 206 may receive or define an out-neighbor threshold value ($\alpha$) where, for all vertices u and $v \in P(u)$, either u is directly connected to v, or u has an out-neighbor $w \in P(u)$ such that $\alpha \|v-w\| \leq \|u-v\|$ for some $\alpha > 1$.

The out-neighbor threshold value may be determined based on a variety of factors and desired aggressiveness of applying the searching algorithm. For example, the out-neighbor threshold value may be determined based on available memory of the computing device 104 or a quantity of storage space on the data storage (e.g., a size of available SSD storage). The out-neighbor threshold value may further be determined based on a desired throughput or latency metric.

As shown in FIG. 2, the graph generation system 106 (e.g., the second refinement system) can output a refined search graph. The output search graph may include enhanced navigability based on updated out-neighbor data by the first refinement system 204 that ensures that each vertex from a set of vertices includes self-referencing or otherwise navigable paths throughout the search graph. Moreover, the output search graph may include optimized paths of vertices throughout the graph based on updated out-neighbor data by the second refinement system 206 in accordance with the out-neighbor threshold value.

Figure 3:
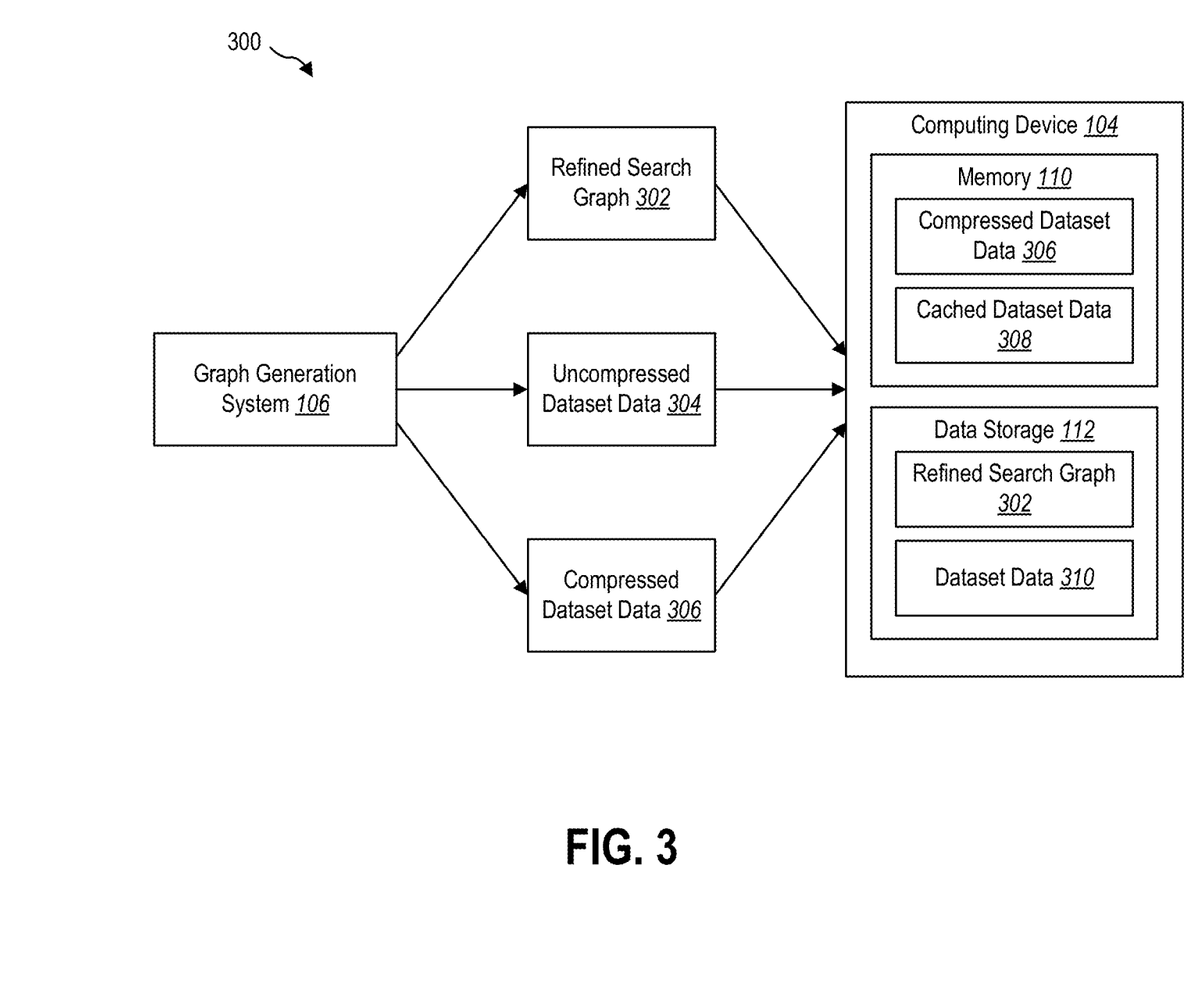
FIG. 3 illustrates an example workflow for generating and providing a search graph and associated dataset data for storage on a computing device in accordance with one or more embodiments.

FIG. 3 illustrates an example workflow 300 showing one example implementation of the graph generation system 106 providing dataset and/or graph data to a computing device 104. As shown in FIG. 3, the graph generation system 106 provides the refined search graph 302 and associated data for storage on a computing device 104. In particular, as shown in FIG. 3, the graph generation system 106 can provide the refined search graph 302 to the computing device 104. The computing device 104 may store the refined search graph 302 on a data storage 112 of the computing device 104. As mentioned above, the data storage 112 may refer to an SSD storage of the computing device 104. Alternatively, the data storage 112 may refer to other types of storage (e.g., non-volatile storage) devices or storage disks capable of storing the refined search graph.

The graph generation system 106 (or other system) may further provide the dataset data (e.g., uncompressed dataset data 304) and compressed dataset data 306 to the computing device 104. As shown in FIG. 3, the computing device 104 may store the compressed dataset data 306 in a memory 110 (e.g., DRAM) of the computing device 104. The computing device 104 may also store the dataset data 310 (e.g., the non-compressed dataset data 304 and associated data) on the data storage 112 of the computing device 104.

In one or more implementations, the query search system 108 computes distances using compressed vectors while using a product quantization compression scheme. In particular, the data points may be compressed into fixed length codes that can be used to efficiently obtain approximate distances at query time. While the query search system 108 may access the full-precision coordinates stored on the data storage, the query search system 108 may cooperatively access the compressed coordinates and full-precision coordinates while processing a search query to reduce a number of reads of data from the data storage 112.

In one or more implementations, the query search system 108 utilizes the compressed dataset data 306 to approximate k-nearest neighbors. Nevertheless, by storing the full-precision coordinates (e.g., the non-compressed dataset data 304) in conjunction with the search graph 114, the query search system 108 can retrieve the full precision coordinates of a point at the same time or as part of the same read process that the query search system 108 accesses or reads data from the search graph 114. The full precision coordinates may be stored temporarily in the memory 110 and re-ranked prior to returning a final set of nearest neighbors after processing the search query identifies a vertex of interest. Indeed, by storing the non-compressed dataset on the data storage 112, the query search system 108 can effectively piggyback the cost of fetching the vector data from the search graph 114 on the cost of expanding the neighborhoods.

In one or more embodiments, the computing device 104 further stores or generates cached dataset data 308 for ready access on a memory 110 of the computing device 104. For example, the computing device 104 (e.g., the search query system 108) can generate cached dataset data 308 (e.g., a cached dataset) including information about a navigation vertex and associated neighborhood data, which may include an identification of out-neighbors to the navigation vertex as well as out-neighbor data for vertices within one or more hops away from the navigation vertex. The cached dataset data 308 may include data about the navigation vertex and out-neighbor data for a threshold number of hops (e.g., 2-4 hops) away from the navigation vertex.

As used herein, a "navigation vertex" or "navigation point" refers to an initially identified vertex from which a path of vertices is identified when applying a search algorithm. In one or more embodiments, the navigation vertex refers to a central or common initiation point within the graph (e.g., the random graph or any iteration of the search graph). Alternatively, the navigation vertex may be randomly selected. The navigation vertex may refer to the same vertex within the graph in performing searches and/or when applying the search algorithm on each iteration involved in constructing the search graph. Alternatively, the navigation vertex may refer to different vertices on each application of the search algorithm and/or based on whether a system is processing a search query or constructing the search graph.

In addition to neighbor data and out-neighbor data from the refined search graph, the cached dataset data 308 may further include uncompressed dataset data 304 for those vertices close to or within a threshold number of hops to the navigation vertex. As an example, the cached dataset data 308 may include a subset of the dataset data 310 for a threshold number of vertices within a neighborhood (e.g., the closest 200 points) to the navigation vertex. In processing a query (as discussed in connection with FIG. 4), the computing device 104 (e.g., the query search system 108) may further update the cached dataset data 308 to reflect dataset data corresponding to vertices within a neighborhood of a current vertex along a path of vertices as the query search system 108 navigates to a destination vertex closest to a location within the search graph mapped to or otherwise assigned to the search query.

As mentioned above, in one or more implementations, the search graph 114 is stored on SSD storage (or other non-volatile storage) of the computing device 104. In one or more implementations, the search graph 114 is stored as an adjacency list on the SSD and accessed to fetch neighborhood data for a point of the dataset only when expanding while applying the search algorithm to the search graph 114. In one or more implementations, for each node, all adjacency lists may be padded with zeros to standardize the size of a vertex neighborhood on the data storage to a max degree of the search graph 114 and pack multiple vertices per sector of a disk on the data storage 112. While this may consume more disk space on the data storage 112, it may nonetheless reduce a memory footprint of storing offsets of each vertex on the data storage 112.

In one or more implementations, better latencies are obtained using flash technology. For example, while flash based SSD storage may serve over 500,000 random reads per second, extracting may involve backlogging input/output (I/O) queues of a disk. While operating at peak throughput with backlogged queues, the latency of a read can exceed a millisecond. Accordingly, the SSD storage may operate in a low load factor regime to obtain low latency. By operating at low beam widths (e.g., W=2, W=4, W=8) performing a beam search can strike a balance between providing good latency and throughput.

Indeed, while one or more embodiments described herein specifically describe storing the search graph 114 on an SSD storage, features and functionality described in connection with a search graph 114 on an SSD storage may similarly apply to a search graph 114 stored and made accessible via any disk storage. For example, a search graph 114 and dataset may be stored on one or more spinning hard drives. For instance, where a primary consideration is to store large indices on a cheaper or affordable storage system with fewer guarantees on throughput or latency, the graph generation system 106 may implement the graph and/or dataset using different types of storage having slower access speeds.

Figure 4:
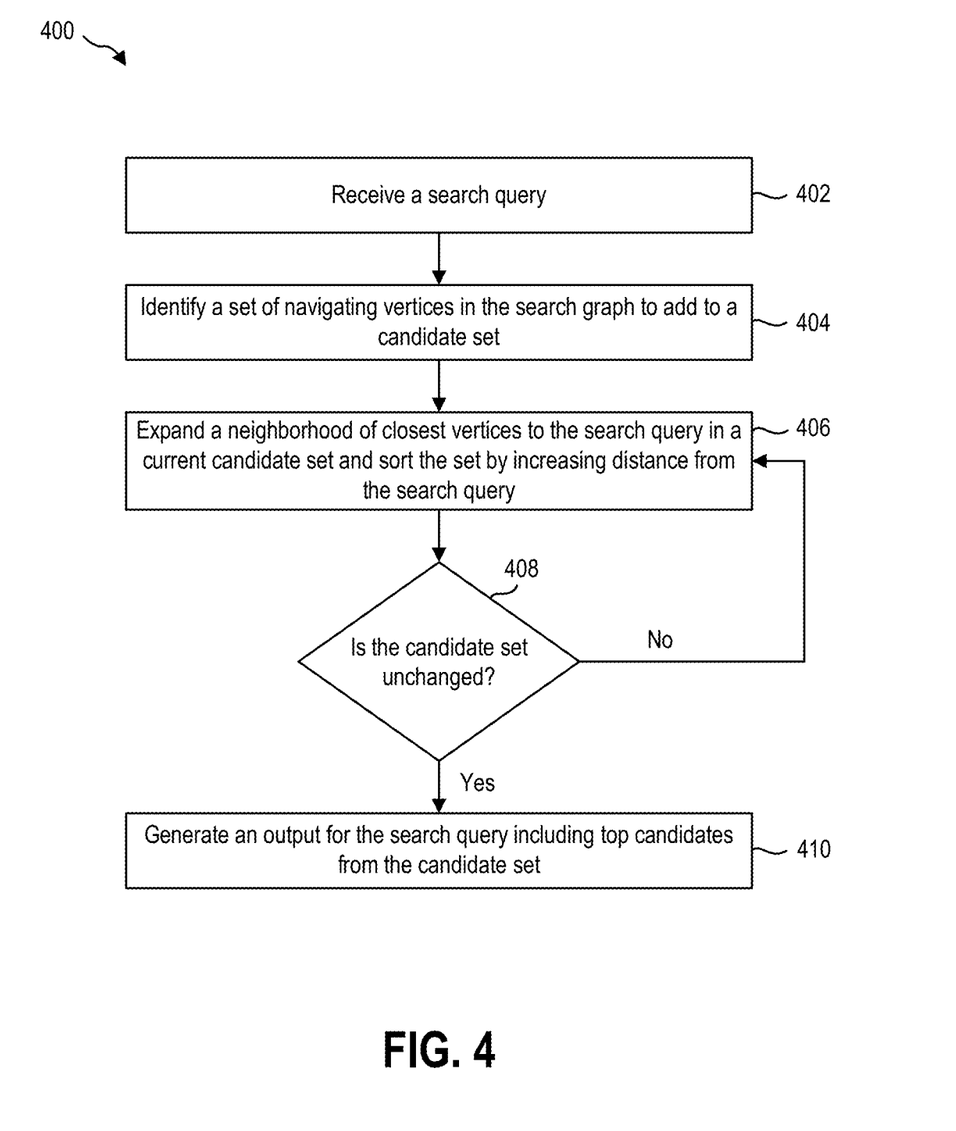
FIG. 4 illustrates an example series of acts for processing a search query based on a search graph generated in accordance with one or more embodiments.

Proceeding onto FIG. 4, the query search system 108 may perform a series of acts 400 to process a search query based on the refined search graph. In particular, FIG. 4 illustrates an example series of acts 400 includes acts that the query search system 108 may perform in processing a search query with the aid of a search graph 114 generated in accordance with one or more embodiments described above.

As shown in FIG. 4, the query search system 108 may perform an act 402 of receiving or generating a search query (e.g., based on a search input). In one or more embodiments, the search query is represented by a set of numbers (e.g., a vector) having a similar representation of values (e.g., a similar format) as values of corresponding points within the dataset. In one or more embodiments, the query search system 108 receives a search query having the prescribed format of points within the dataset.

As further shown in FIG. 4, the query search system 108 may perform an act 404 of identifying a set of navigating vertices in the search graph to add to a candidate set. In one or more embodiments, the query search system 108 identifies the same set of navigating vertices for each search no matter the value of a search query. For instance, the query search system 108 may identify a centrally located vertex or set of vertices within the search graph 114 to be assigned as a set of navigation vertices for each search query. Alternatively, in one or more implementations, the query search system identifies any random vertex or set of vertices to be assigned as a navigation vertex (or set of navigating vertices) for any specific search query or for all search queries. As noted above in connection with FIG. 3, the query search system may maintain or store a cache of dataset data on a memory 110 of the computing device including information for the vertex and one or more neighboring vertices, which may include limited information (e.g., information for vertices within the predetermined number of hops) from the refined search graph 114 as well as associated non-compressed dataset data. In one or more implementations, the cached dataset data may further include neighborhood data for one or more vertices around a current candidate vertex, which may initially be the navigation vertex.

As shown in FIG. 4, the query search system 108 may perform an act 406 of expanding a neighborhood of closest vertices to a search query in a current candidate set of vertices. The query search system 108 may further sort the set based on increasing distance from the search query. Expanding the neighborhood may include identifying out-neighbors and associated neighborhood information for the navigation vertex (or a current set of vertices). In one or more embodiments, this information is pre-fetched for the navigation vertex as each search performed from the navigation vertex will likely involve reading graph data and dataset data for those vertices within a neighborhood of the navigation vertex. Alternatively, the query search system 108 may simply fetch out-neighbor data and associated neighborhood information for the navigation vertex and associated dataset data from the data storage of the computing device 104 in response to receiving the search query.

The query search system 108 may expand the neighborhood of a vertex at any point along an identified path in a variety of ways. For example, at an initial point (e.g., the navigation vertex), the query search system 108 may fetch any non-cached neighborhood and out-neighbor data for one or multiple out-neighbors. For instance, in one or more implementations, the query search system 108 fetches out-neighbor data (e.g., out-neighbor connections and/or neighborhood data) for 2, 4 (or other number) of promising candidates. The query search system 108 may utilize this information to identify a most promising path (or multiple promising paths) for determining a subsequent vertex to select in drawing a more efficient path to a destination associated with the search query.

At one or more iterative updates of expanding a neighborhood and sorting a current candidate set, the query search system 108 may perform an act 408 of determining whether the candidate set is unchanged. Where the candidate set has changed between iterative updates, the query search system 108 may again perform act 406 and iteratively update the candidate set in accordance with one or more embodiments described herein. Alternatively, where the candidate set is unchanged, the query search system 108 may determine that the candidate set has converged to the search query and output a set of results.

For example, as shown in FIG. 4, the query search system 108 can perform an act 410 of generating an output for the search query including top candidates from the candidate set. This list of candidates may represent points within the dataset spatially close or within a neighborhood associated with the search query and return a listing or results including a number of points or objects from the dataset closest to a point within the dataset corresponding to the candidate node. This listing of results may indicate a neighborhood of results that best reflect the mapped location of the search query. In one or more embodiments, the listing of results may include a set of results for the dataset stored in the cache of dataset data stored within the memory 110 while performing the navigation algorithm and identifying vertices along the path to the location of the search query.

Figure 5:
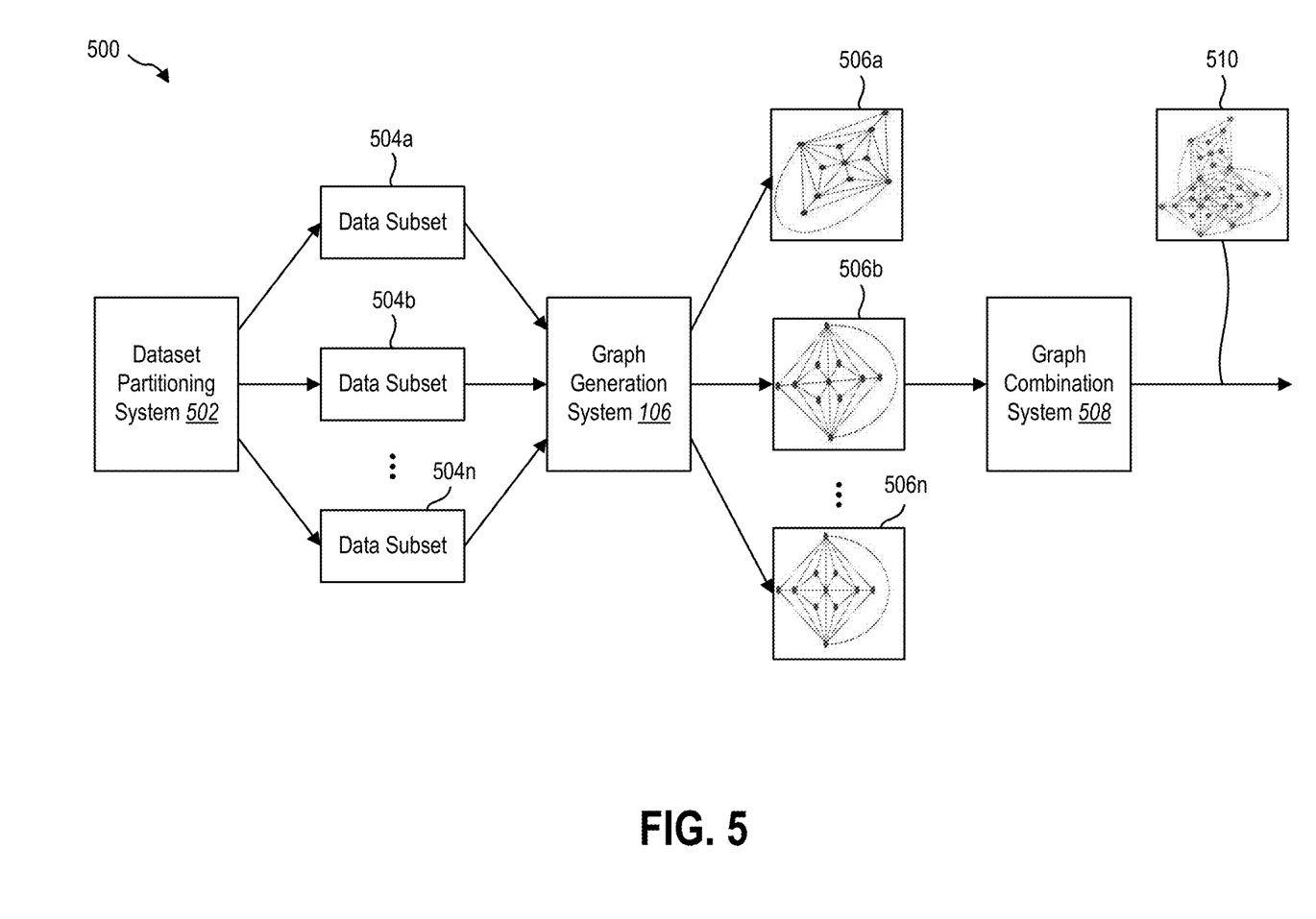
FIG. 5 illustrates an example workflow for generating search graphs representative of subsets of a dataset and combining the search graphs in accordance with one or more embodiments.

FIG. 5 illustrates an example workflow 500 including an implementation of one or more embodiments described herein in which the graph generation system 106 facilitates generating a combined search graph including a composite of multiple search graphs. For example, as shown in FIG. 5, the workflow 500 includes a dataset partitioning system 502, the graph generation system 106, and a graph combination system 508. The dataset partitioning system 502 may be implemented on the server device(s) 102, computing device 104, or other device not illustrated in FIG. 1. In one or more embodiments, the data partitioning system 502 is implemented as a component of the graph generation system 106. Moreover, the graph combination system 508 may similarly be implemented on the server device(s) 102, computing device 104, or other device not illustrated in FIG. 1. In one or more embodiments, the graph combination system 508 is implemented as a component of the graph generation system 106. In one or more implementations, each of the dataset partitioning system 502, graph generation system 106, and graph combination system 508 are implemented on a common computing device (e.g., a desktop computer, laptop computer, or other type of computing device as discussed above in connection with FIG. 1).

As shown in FIG. 5, the dataset partitioning system 502 may generate a plurality of data subsets 504a-n. The data subsets may include portioned subsets of a dataset. For example, the dataset partitioning system 502 may generate a predetermined number of "shards" or grouped subsets of datapoints grouped by similarity or based on shared characteristics. In one or more embodiments, the dataset partitioning system 502 generates data subsets 504a-n including clusters that are spatially localized within a special representation of the dataset.

In generating the data subsets 504a-n, the dataset partitioning system 502 may ensure that each datapoint is found in at least two of the data subsets 504a-n. For example, a first datapoint may be located in both a first data subset 504a and a second data subset 504b. Further, a second datapoint may be located in both a first data subset and a third data subset (or any combination of two or more subsets). The dataset partitioning system 502 may further maintain mapping information to identify overlapping datapoints between multiple subsets 504a-n. In one or more embodiments, each of the data subsets 504a-n includes at least two or more datapoints in each of the other data subsets generated by the dataset partitioning system 502. Accordingly, as will be discussed below, each of the data subsets 504a-n may include overlapping data with each of the additional data subsets.

Each of the data subsets 504a-n may be provided to the graph generation system 106. In accordance with one or more embodiments described above, the graph generation system 106 may generate search indexes for the data subsets 504a-n. In particular, using a similar process as discussed above in connection with FIG. 2, the graph generation system 106 may generate search graphs 506a-n for each of the data subsets 504a-n including navigable vertices. Moreover, the graph generation system 106 can refine edges and out-neighbor information to reduce a number of hops when applying a search algorithm to vertices within the respective search graphs 506a-n.

As shown in FIG. 2, the graph combination system 508 may receive each of the search graphs 506a-n corresponding to the respective data subsets 504a-n. The graph combination system 508 can further combine the search graphs 506a-n to generate a combined search graph 510 for use in processing a search query. For example, because each of the points from the data subsets 504a-n are included within two or more respective data subsets, the combined search graph 510 may be navigable from any portion of the search graph to any other portion of the search graph representative of a different data subset. In one or more embodiments, the graph combination system 508 generates the combined search graph 510 by adding the overlapping portions of the search graphs 506a-n corresponding to the data subsets 504a-n.

While not explicitly shown in FIG. 5, the combined search graph 510 may similarly be provided to and/or stored on the computing device 104 in accordance with one or more embodiments described herein. For example, the computing device 104 may store the combined search graph 510 and non-compressed dataset data on a data storage 112 of the computing device 104 while storing a compressed version of the data set on the memory 110 as discussed above in connection with FIG. 3. Similarly, the query search system 108 can process a search query in accordance with one or more examples discussed above in connection with FIG. 4. For instance, the query search system 108 can store cached data including portions of the combined search graph 510 and associated dataset data (e.g., the non-compressed dataset data) while applying a search algorithm to the dataset and associated combined search graph 510.

By partitioning the dataset and generating the search graphs 506a-n for respective subsets 504a-n, each of the components illustrated in FIG. 5 may be implemented on a computing device 104 having limited processing and storage resources. Indeed, where generating an entire search graph based on the entire dataset as discussed in FIG. 2 may require additional resources afforded by a network of server devices, discretely generating search graphs for respective data subsets and combining the search graphs may involve significantly fewer processing resources. This may result in utilizing fewer resources or even enabling a consumer electronic device or other computing device having fewer available processing resources to generate a search index in accordance with one or more embodiments described herein.

Figure 6:
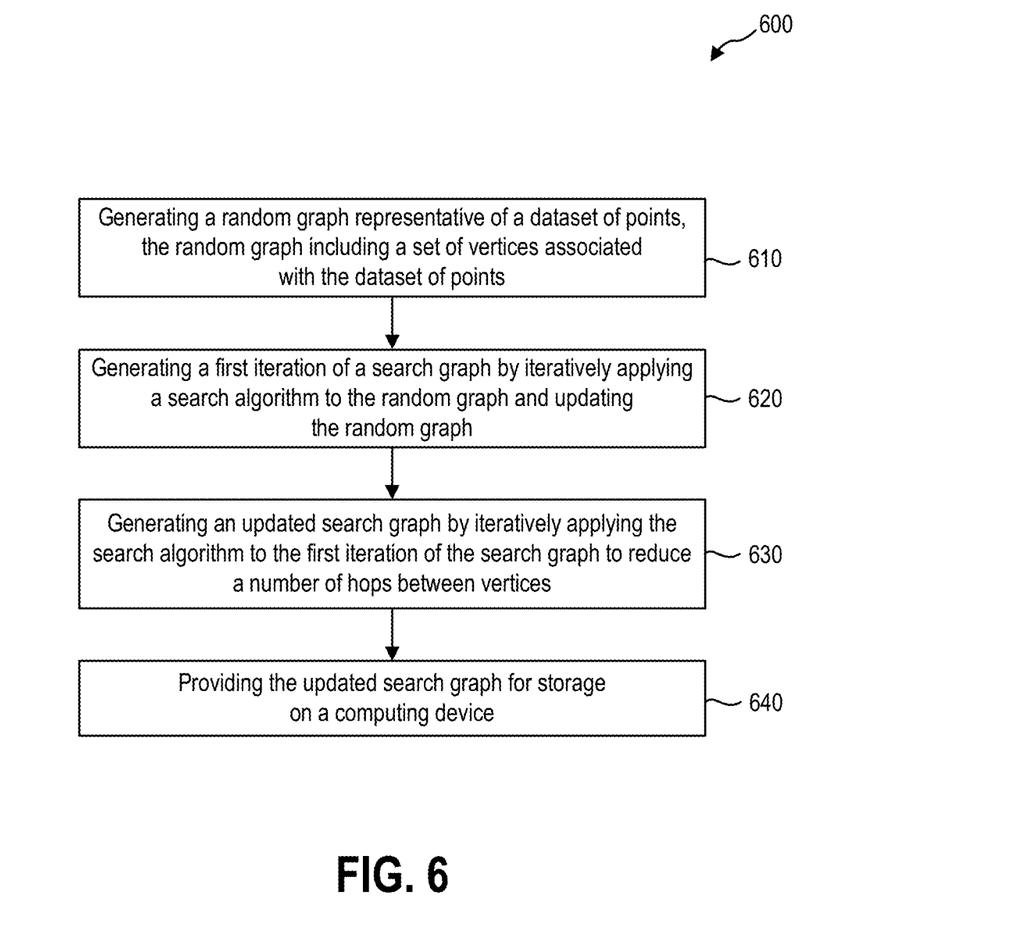
FIG. 6 illustrates an example series of acts for generating a search graph in accordance with one or more embodiments.
Figure 7:
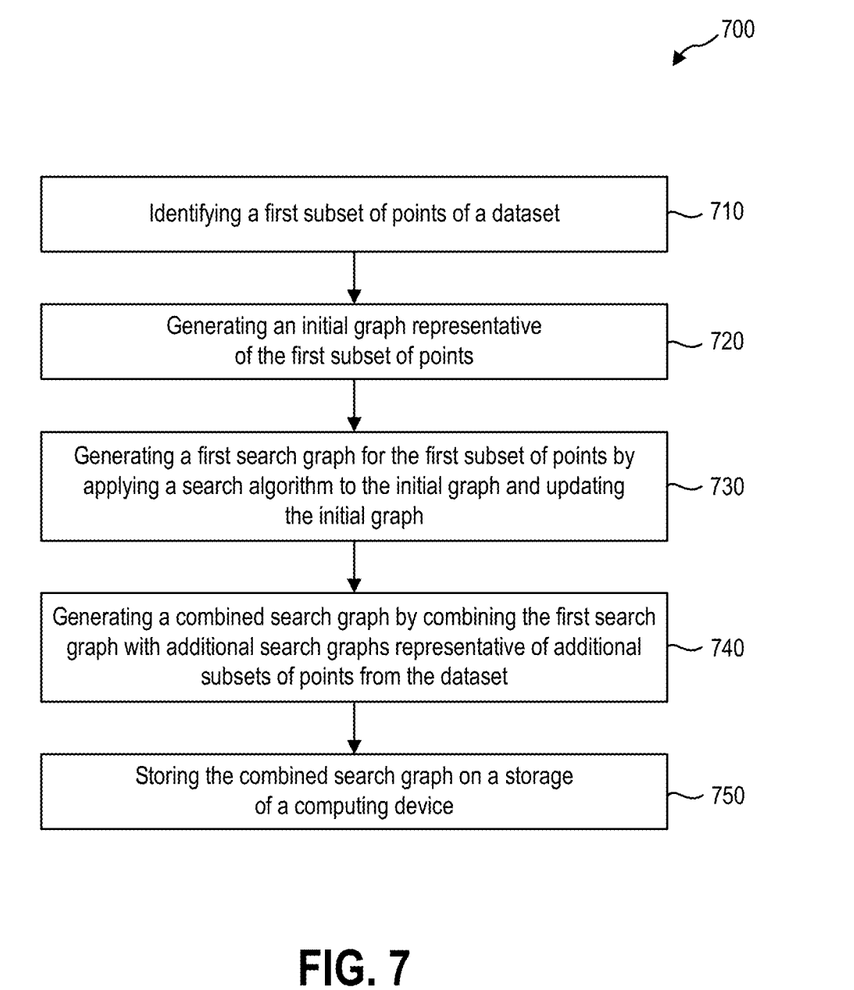
FIG. 7 illustrates another example series of acts for generating a search graph in accordance with one or more embodiments.

Turning now to FIGS. 6-7, these figures illustrate example flowcharts including series of acts for generating and implementing search graphs for use in processing search queries. While FIGS. 6-7 illustrate acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable medium can include instructions that, when executed by one or more processors, cause a computing device to perform the acts of FIGS. 6-7. In still further embodiments, a system can perform the acts of FIGS. 6-7.

For example, FIG. 6 illustrates a series of acts 600 for generating and implementing a search graph in accordance with one or more embodiments described herein. As shown in FIG. 6, the series of acts 600 includes an act 610 of generating a random graph representative of a dataset of points where the random graph includes a set of vertices associated with the dataset of points. For example, the act 610 may include generating a random graph representative of a dataset of points, the random graph including a set of vertices associated with the dataset of points and randomly assigned out-neighbor data for the set of vertices. In one or more embodiments, generating the random graph includes identifying, for each vertex from the set of vertices, a predetermined number of vertices from the set of vertices to assign as out-neighbors to the vertex. Identifying the predetermined number of vertices may include identifying, for each vertex from the set of vertices, randomly selected vertices from all vertices of the random graph.

As further shown, the series of acts 600 may include an act 620 of generating a first iteration of a search graph by iteratively applying a search algorithm to the random graph and updating the random graph to include navigable paths. For example, the act 620 may include generating a first iteration of a search graph by iteratively applying a search algorithm for each vertex of the set of vertices and updating the random graph by modifying the randomly assigned out-neighbor data to ensure that each vertex includes a path that may be reached from a navigation vertex using a search algorithm.

In one or more embodiments, generating the first iteration of the search graph includes identifying, for a first vertex, a set of vertices visited by a traversal between a pair of vertices (e.g., the first vertex and a start vertex). Generating the first iteration may further include updating out-neighbor data to ensure that a first vertex include one or more paths from a start vertex (e.g., a navigation vertex) in the search graph. In one or more embodiments, generating the first iteration of the search graph includes iteratively identifying sets of vertices visited by traversals between pairs of vertices for each vertex of the search graph to ensure that each vertex from the identified set includes an out-neighbor to a diverse set of vertices.

As further shown, the series of acts 600 may include an act 630 of generating an updated search graph by iteratively applying the search algorithm to the first iteration of the search graph to reduce a number of hops between vertices. For example, the act 630 may include generating an updated search graph by iteratively applying the search algorithm for each vertex of the set of vertices and refining out-neighbor data from the first iteration of the graph to reduce a number of hops between vertices of the set of vertices.

In one or more embodiments, generating the updated search graph includes identifying an out-neighbor threshold value indicating a measure of aggressiveness for the search algorithm associated with refining out-neighbor data to reduce the number of hops between vertices of the set of vertices. In one or more embodiments, the out-neighbor threshold value is determined based on a target size for the updated search graph to be stored within the storage of the computing device.

As further shown, the series of acts 600 may include an act 640 of providing the updated search graph for storage on a computing device. In one or more embodiments, the series of acts 600 includes providing a compressed representation of the dataset to be accessible via a memory of the computing device. The series of acts 600 may further include providing a non-compressed representation of the dataset to be stored on a solid-state storage (SSD) of the computing device.

In one or more embodiments, the series of acts 600 includes receiving a query associated with the dataset and applying a navigation algorithm to the updated search graph based on the query to identify a neighborhood within the dataset corresponding to the query. In one or more implementations, applying the navigation algorithm to the updated search graph includes identifying an initial navigation point within the search graph and applying the navigation algorithm from the initial navigation point to follow a navigable path of vertices from the updated search graph until converging at a location within the search graph corresponding to the query. In one or more implementations, the initial navigation point includes a randomly selected vertex within the updated search graph or a predetermined vertex within the updated search graph for use in processing multiple subsequent queries.

FIG. 7 illustrates another example series of acts 700 associated with generating and implementing a search graph in accordance with one or more embodiments described herein. For example, as shown in FIG. 7, a series of acts 700 may include an act 710 of identifying a first subset of points of a dataset. For example, the act 710 may include identifying a first subset of points from a plurality of subsets of points from a dataset of points. In one or more embodiments, each point from the first subset of points (and each additional subset from the plurality of subsets) is found in at least one additional subset of points from the plurality of subsets of points.

As further shown in FIG. 7, the series of acts 700 may include an act 720 of generating an initial graph representative of the first subset of points. For example, the act 720 may include generating an initial graph representative of the first subset of points, the initial graph including a first set of vertices associated with the subset of points. In one or more implementations, generating the initial graph includes identifying, for each vertex from the first set of vertices, a predetermined number of vertices from the first set of vertices to assign as out-neighbors to the vertex. Moreover, identifying the redetermined number of vertices may include identifying, for each vertex from the first set of vertices, randomly selected vertices from all vertices of the first set of vertices.

As further shown, the series of acts 700 may include an act 730 of generating a first search graph for the first subset of points by applying a search algorithm to the initial graph and updating the initial graph to include self-referencing or otherwise navigable paths. For example, the act 730 may include generating a first search graph for the first subset of points by iteratively applying a search algorithm for each vertex from the first set of vertices and updating the first search graph by adding out-neighbors between vertices of the first set of vertices to ensure that each vertex from the first set of vertices includes a navigable path while reducing a number of hops between vertices of the first set of vertices.

As shown in FIG. 7, the series of acts 700 may include an act 740 of generating a combined search graph by combining the first search graph with additional search graphs representative of additional subsets of points from the dataset. For example, the act 740 may include generating a combined search graph representative of the dataset of points by combining the first search graph with additional search graphs representative of additional subsets of points from the plurality of subsets of points.

As further shown in FIG. 7, the series of acts 700 may include an act 750 of storing the combined search graph on a storage of a computing device. In one or more embodiments, the series of acts 700 includes receiving a query associated with the dataset and applying a navigation algorithm to the combined search graph based on the query to identify a neighborhood within the dataset corresponding to the query. In one or more implementations, generating the combined the combined search graph and applying the navigation algorithm to the combined search graph are performed by the computing device. In one or more implementations, the series of acts 700 includes maintaining a compressed representation of the dataset to be accessible via a memory of the computing device. The series of acts 700 may also include storing a non-compressed representation of the dataset on a solid-state storage (SSD) of the computing device.

Figure 8:
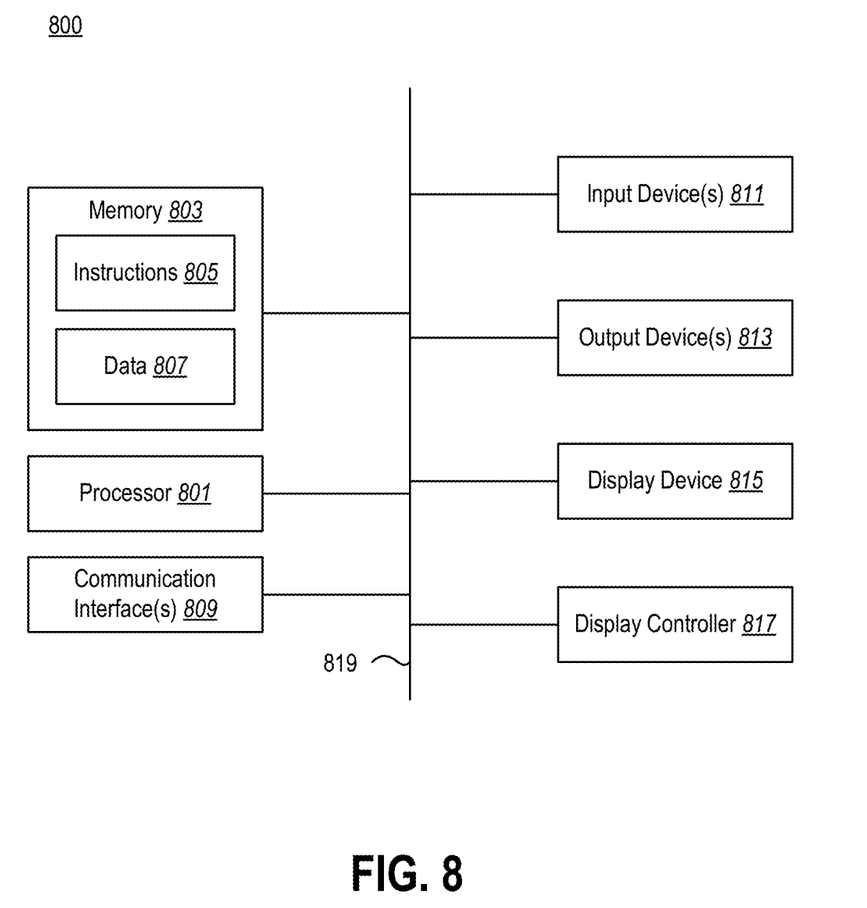
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 7 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   generating a random graph representative of a dataset of points, the random graph including a set of vertices associated with the dataset of points and randomly assigned out-neighbor data for each vertex of the set of vertices;
   generating a first iteration of a search graph by iteratively applying a search algorithm for each vertex of the set of vertices and updating the random graph by modifying the randomly assigned out-neighbor data to ensure that each vertex of the set of vertices includes a navigable path from each vertex to a start vertex;
   generating an updated search graph by iteratively applying the search algorithm for each vertex of the set of vertices and refining out-neighbor data from the first iteration of the graph to reduce a number of hops between vertices of the set of vertices; and
   providing the updated search graph for storage on a computing device.

2. The method of claim 1, wherein generating the random graph comprises identifying, for each vertex from the set of vertices, a predetermined number of vertices from the set of vertices to assign as out-neighbors to the vertex.

3. The method of claim 2, wherein identifying the predetermined number of vertices comprises identifying, for each vertex from the set of vertices, randomly selected vertices from all vertices of the random graph.

4. The method of claim 1, wherein generating the first iteration of the search graph comprises:
   for a first vertex from the set of vertices:
      identifying a first set of vertices visited by a traversal between a-the start vertex and the first vertex; and
      updating out-neighbor data for the first set of vertices to ensure that each vertex from the first set of vertices includes an out-neighbor to a diverse set of vertices.

5. The method of claim 1, wherein generating the first iteration of the search graph comprises iteratively identifying paths of vertices and updating out-neighbor data for vertices along the identified paths of vertices to ensure that each vertex from the set of vertices includes one or more navigable paths from each vertex to the start vertex.

6. The method of claim 1, wherein generating the updated search graph comprises identifying an out-neighbor threshold value indicating a measure of aggressiveness for the search algorithm associated with refining out-neighbor data to reduce the number of hops between vertices of the set of vertices.

7. The method of claim 6, wherein the out-neighbor threshold value is determined based on a target size for the updated search graph to be stored within the storage of the computing device.

8. The method of any of claim 1, further comprising:
   receiving a query associated with the dataset; and
   applying a navigation algorithm to the updated search graph based on the query to identify a neighborhood within the dataset corresponding to the query.

9. The method of claim 8, wherein applying the navigation algorithm to the updated search graph comprises:
   identifying an initial navigation point within the search graph; and
   applying the navigation algorithm from the initial navigation point to follow a navigable path of vertices from the updated search graph until converging at a location within the search graph corresponding to the query.

10. The method of claim 9, wherein the initial navigation point comprises:
    a randomly selected vertex within the updated search graph; or
    a predetermined vertex within the updated search graph for use in processing multiple subsequent queries.

11. The method of claim 1, further comprising:
    providing a compressed representation of the dataset to be accessible via a memory of the computing device; and
    providing a non-compressed representation of the dataset to be stored on a solid-state storage (SSD) of the computing device.

12. A method, comprising:
    identifying a first subset of points from a plurality of subsets of points from a dataset of points;
    generating an initial graph representative of the first subset of points, the initial graph including a first set of vertices associated with the subset of points;
    generating a first search graph for the first subset of points by iteratively applying a search algorithm for each vertex from the first set of vertices and updating the first search graph by adding out-neighbors between vertices of the first set of vertices to ensure that each vertex from the first set of vertices includes a navigable path from each vertex to a start vertex while reducing a number of hops between vertices of the first set of vertices;
generating a combined search graph representative of the dataset of points by combining the first search graph with additional search graphs representative of additional subsets of points from the plurality of subsets of points; and
storing the combined search graph on a storage of a computing device.

13. The method of claim 12, further comprising
receiving a query associated with the dataset;
apply a navigation algorithm to the combined search graph based on the query to identify a neighborhood within the dataset corresponding to the query.

14. The method of claim 13, wherein generating the combined the combined search graph and applying the navigation algorithm to the combined search graph are performed by the computing device.

15. The method of claim 12, further comprising:
maintaining a compressed representation of the dataset to be accessible via a memory of the computing device; and
storing a non-compressed representation of the dataset on a solid-state storage (SSD) of the computing device.

16. The method of claim 12,
wherein generating the initial graph comprises identifying, for each vertex from the first set of vertices, a predetermined number of vertices from the first set of vertices to assign as out-neighbors to the vertex; and
wherein identifying the predetermined number of vertices comprises identifying, for each vertex from the first set of vertices, randomly selected vertices from all vertices of the first set of vertices.

17. The method of claim 12, wherein each point from the first subset of points is found in at least one additional subset of points from the plurality of subsets of points.

18. A system, comprising:
one or more processors;
a memory in electronic communication with the one or more processors; and
instructions stored in the memory, the instructions being executable by the one or more processors to:
generate a random graph representative of a dataset of points, the random graph including a set of vertices associated with the dataset of points and randomly assigned out-neighbor data for each vertex of the set of vertices;
generate a first iteration of a search graph by iteratively applying a search algorithm for each vertex of the set of vertices and updating the random graph by modifying the randomly assigned out-neighbor data to ensure that each vertex of the set of vertices includes a navigable path from each vertex to a start vertex;
generate an updated search graph by iteratively applying the search algorithm for each vertex of the set of vertices and refining out-neighbor data from the first iteration of the graph to reduce a number of hops between vertices of the set of vertices; and
store the updated search graph for storage on a computing device.

19. The system of claim 18,
wherein generating the updated search graph comprises identifying an out-neighbor threshold value indicating a measure of aggressiveness for the search algorithm associated with refining out-neighbor data to reduce the number of hops between vertices of the set of vertices; and
wherein the out-neighbor threshold value is determined based on a target size for the updated search graph to be stored within the storage of the computing device.

20. The system of claim 18, further comprising instructions being executable by the one or more processors to:
receive a query associated with the dataset;
apply a navigation algorithm to the updated search graph based on the query to identify a neighborhood within the dataset corresponding to the query, wherein applying the navigation algorithm to the updated search graph comprises:
identifying an initial navigation point within the search graph; and
applying the navigation algorithm from the initial navigation point to follow a navigable path of vertices from the updated search graph until converging at a location within the search graph corresponding to the query.

* * * * *